United States Patent [19]

Rado

[11] Patent Number: 4,457,812
[45] Date of Patent: Jul. 3, 1984

[54] CRITICAL SOLVENT SEPARATIONS IN INORGANIC SYSTEMS

[75] Inventor: Theodore A. Rado, Oklahoma City, Okla.

[73] Assignee: Kerr-McGee Chemical Corporation, Oklahoma City, Okla.

[21] Appl. No.: 514,499

[22] Filed: Jul. 18, 1983

[51] Int. Cl.³ .................. C25C 1/02; C25C 1/06; C25C 1/16; C25C 1/18
[52] U.S. Cl. .................. 204/66; 204/64 R; 204/67; 210/634; 210/912; 423/70; 423/92; 423/98; 423/109; 423/116; 423/131; 423/103; 423/126; 423/140; 423/112; 423/491; 423/493; 423/494; 423/495; 423/496
[58] Field of Search .............. 204/59 R, 64 R, 66, 204/67; 210/634, 912; 423/89, 98, 99, 109, 139, 150, 131, 135, 493–495, 489, 110, 112, 113, 116, 126, 140, 92, 496, 491

[56] References Cited

U.S. PATENT DOCUMENTS

| 3,906,077 | 9/1975 | Rado et al. ..................... 423/149 |
| 3,938,969 | 2/1976 | Sebenik et al. ..................... 55/71 |
| 3,969,196 | 7/1976 | Zosel ..................... 203/49 |
| 4,035,169 | 7/1977 | Sebenik et al. ..................... 55/71 |
| 4,070,448 | 1/1978 | Jacobs et al. ..................... 423/495 |
| 4,083,923 | 4/1978 | Lippman et al. ..................... 423/79 |
| 4,283,371 | 8/1981 | Rado ..................... 423/126 |

FOREIGN PATENT DOCUMENTS 613392 1/1961 Canada ..................... 210/634

Primary Examiner—R. L. Andrews
Attorney, Agent, or Firm—William G. Addison

[57] ABSTRACT

A process for separating inorganic substances involving their abstraction from a mixture with near-supercritical inorganic fluids. One or more inorganic substances are abstracted and then separatively recovered by retrograde condensations. The process particularly is applicable with mixtures obtained from the chlorination of metalliferous ores and may be conjoined to many ancillary metal abstraction processes such as volatilizations, distillations or electrolyses.

35 Claims, 2 Drawing Figures

CRITICAL SOLVENT SEPARATIONS IN INORGANIC SYSTEMS

BACKGROUND OF THE INVENTION

The field of metallurgy includes the processing of metal-containing ores to produce purified metals and chemical compounds thereof. One particular mode of such processing involves the conversion of metals in the ore to particular types of salts, such as, for example, chlorides, to produce a mixture of metallic chlorides.

The present invention is related particularly, but not by way of limitation, to methods of separating a mixture comprising metallic salts, especially metallic chlorides. The methods of the present invention further involve the abstraction of metallic salts into supercritical or near-supercritical fluids and selective retrograde condensation to separate and recover particular metal salts.

SUMMARY OF THE INVENTION

A process for separating inorganic substances from a mixture comprising said inorganic substances, the process comprising the following steps: first, contacting said mixture with a near-supercritical fluid which preferentially takes up at least one inorganic substance at the contacting conditions of near-supercritical temperature and pressure such that the near-supercritical fluid takes up at least a portion of at least one inorganic substance, forming a near-supercritical fluid phase; next, the near-supercritical phase is segregated from any of the mixture not taken up by the near-supercritical fluid while still maintaining aforesaid supercritical conditions, and then separating at least a portion of at least one of said taken-up inorganic substances from the near-supercritical fluid phase.

DESCRIPTION OF THE PREFERRED EMBODIMENTS

Figure 1:
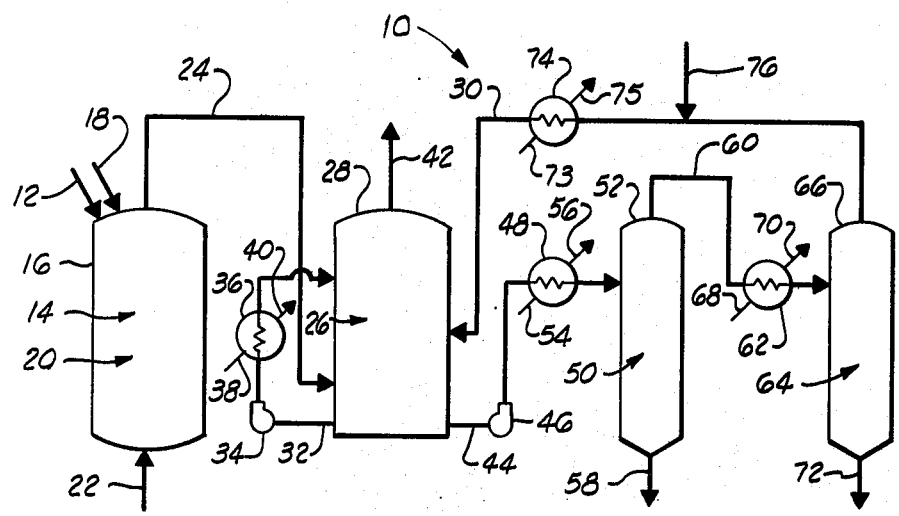
FIG. 1 is a schematic diagram of the flow of materials in an embodiment of the process of the present invention.

The separation, isolation and recovery of inorganic substances, such as minerals, elements or compounds, may be accomplished according to the methods of the present invention involving the taking up of such inorganic substances in near-supercritical fluids. The taken-up substances may be separated and recovered and the near-supercritical fluids reused in a recycle as recycle solvent.

The near-supercritical fluids or recycle solvents utilizable in the processes of the present invention are preferably inorganic, and chemically inert under process conditions with the mixture and substances to be separated and have critical temperatures ranging from about 100 degrees centigrade to about 500 degrees centigrade. Such recycle solvents or near-supercritical fluids potentially could include titanium tetrachloride, silicon tetrachloride, boron trichloride, tin tetrachloride, phosphorous trichloride, sulfur monochloride ($S_2Cl_2$) and carbon tetrachloride. Although chlorides are most clearly pertinent in the practice of the herein described embodiments of the present invention, other salts, elements or compounds could be usable in particular applications.

In certain applications of the present invention, a near-supercritical fluid or recycle solvent is usable to take up a particular and essentially single inorganic substance from a mixture. The taken-up inorganic substance then may be separated from the fluid by inducing conditions of retrograde condensation, increasing the temperature, decreasing the pressure, or both.

In more complex situations, the mixture to be separated contains a plurality of inorganic substances which are taken up by the near-supercritical fluid to form a near-supercritical fluid phase with a plurality of taken-up inorganic substances. The near-supercritical fluid phase containing a plurality of inorganic substances then is subjected to stepwise recovery, for example, by a stepwise application of increasing temperatures or decreasing pressures or both to induce the retrograde condensations of taken-up inorganic substances.

In general, the temperature of the near-supercritical fluid contacting the mixture to take up at least one inorganic substance is within a range of reduced temperatures ($T_R$) of 0.8 to 1.5.

The present invention particularly is applicable to effecting separations of metallic halides such as fluorides, bromides, chlorides or iodides. The most preferred near-supercritical fluids or recycle solvents in particular applications of the present invention, in addition to having those characteristics described earlier herein, are compounds containing the same halide as the metallic halides being separated.

The halogenation of metalliferous ores to produce metallic halides is of particular pertinence to applications of the present invention. Both embodiments of the present invention concern the separation of metallic chloride products of metalliferous ore chlorination.

In the production of aluminum chloride, an important industrial chemical, an ore such as bauxite, is chlorinated and the aluminum chloride purified and separated from other products of bauxite chlorination, particularly iron chloride. Such purification heretofore usually has involved either solvent extractions or distillations or both.

DETAILED DESCRIPTION OF THE DRAWINGS

Shown in FIG. 1 is a process 10 for chlorinating aluminiferous ore and separating aluminum chloride and other chlorination products in accordance with the present invention.

An aluminiferous ore, preferably calcined bauxite and in a finely divided form, is introduced through a conduit 12 into the first chlorination zone 14 of a first chlorinator 16. A carbonaceous reductant, preferably coke and in a finely divided form, is introduced through a conduit 18 into the first chlorination zone 14 to form a first loaded chlorination zone 20. The first loaded chlorination zone 20 preferably is maintained at a temperature in a range from about 600 degrees centigrade to about 1000 degrees centigrade.

Chlorine gas is passed through a conduit 22 into the first loaded chlorination zone 20 to produce a first product stream comprising aluminum trichloride and iron chlorides. The first product stream passes from the first loaded chlorination zone 20 through a conduit 24 and into a first condensation zone 26 formed in a first condensor 28. A recycle solvent, preferably comprising, for example, titanium tetrachloride or silicon tetrachloride and having a temperature in a range between about 20 degrees centigrade and about 70 degrees centigrade, is passed from a source discussed below through a conduit 30 into the first condensing zone 26 of the first condenser 28.

The temperature in the first condensing zone 26 preferably is maintained in the above mentioned range to produce a condensate comprising solid chlorides of aluminum and iron suspended in recycle solvent to form a first slurry comprising about 66 weight percent recycle solvent. At least a portion of the first slurry is circulated through a conduit 32, through a pump 34 and through a cooling chamber 36 for reentry into the first condensation zone 26 at about the above described temperature. A supply of coolant enters the cooling chamber 36 through one conduit 38 and departs through another conduit 40. Vent gases comprising oxides of carbon exit from the first condenser 28 through a conduit 42.

At least a portion of the first slurry is passed from the first condensing zone 26 of the first condenser 28 through a conduit 44, through a pump 46, through a heater 48 and into a first settling zone 50 formed in a first stage settling tank 52. The heater 48, as shown in FIG. 1, is heated by the contact of a heated fluid entering the heater 48 through a conduit 54 and exiting through a conduit 56.

The first slurry in the first settling zone 50 is maintained within a reduced temperature ($T_R$) range of 0.8 to 1.5 and a reduced pressure ($P_R$) range of 0.8 to 1.5 to produce a first near-supercritical fluid phase comprising recycle solvent and taken-up aluminum trichloride and a first solid phase comprising iron chlorides. In the first settling zone 50, the first solid phase is segregated by being permitted to settle to produce a clarified first near-supercritical fluid phase and a settled first solid phase which is withdrawn from the first settling zone 50 of the first stage settling tank 52 through a conduit 58 for recovery or further processing of the iron chlorides.

The clarified first near-supercritical fluid phase is passed from the first settling zone 50 of the first stage settling tank 52 through a conduit 60, through a heater 62 and into a second settling zone 64 formed in a second stage settling tank 66. The heater 62, as shown in FIG. 1, is heated by contact of a heated fluid entering the heater 62 through a conduit 68 and exiting through a conduit 70.

In the second settling zone 64 of the second stae settling tank 66, the clarified first near-supercritical fluid phase is maintained at an increased temperature or a decreased pressure or both as compared to those conditions in the first settling zone 50 to induce a retrograde condensation for producing a second near-supercritical fluid phase comprising recycle solvent and a second phase comprising aluminum trichloride.

The second solid phase is permitted to settle in the second settling zone 64 to form a clarified second near-supercritical fluid phase and a settled second solid phase which is withdrawn through a conduit 72 for recovery or further processing of the aluminum trichloride. The clarified second near-supercritical fluid phase is withdrawn through a conduit 30 from the second settling zone 64 of the second stage settling tank 66 and passed through a cooling chamber 74 for recycle to the first condensing zone 26 of the first condenser 28 as recycle solvent. The cooling chamber 74 is cooled by the passage of coolant therethrough, which enters through a conduit 73 and exiting through a conduit 75. the recycle solvent may be supplemented, as required, by makeup recycle solvent supplied through a conduit 76.

Although the process 10 described above envisions the use of two settling zones 50 and 64, additional settling zones may be interposed for particular applications, such as, for example, when no solid phase is produced in the first settling zone 50. The additional settling zones would be provided to produce additional stages of retrograde condensations and separations of two or more metallic chloride species.

In one method of producing lead and zinc, an oxidized ore is chlorinated at elevated temperatures and volatile chlorides, including those of lead and zinc, are produced. These volatile chlorides have been distillatively separated and electrolytically converted into metallic lead and zinc.

Figure 2:
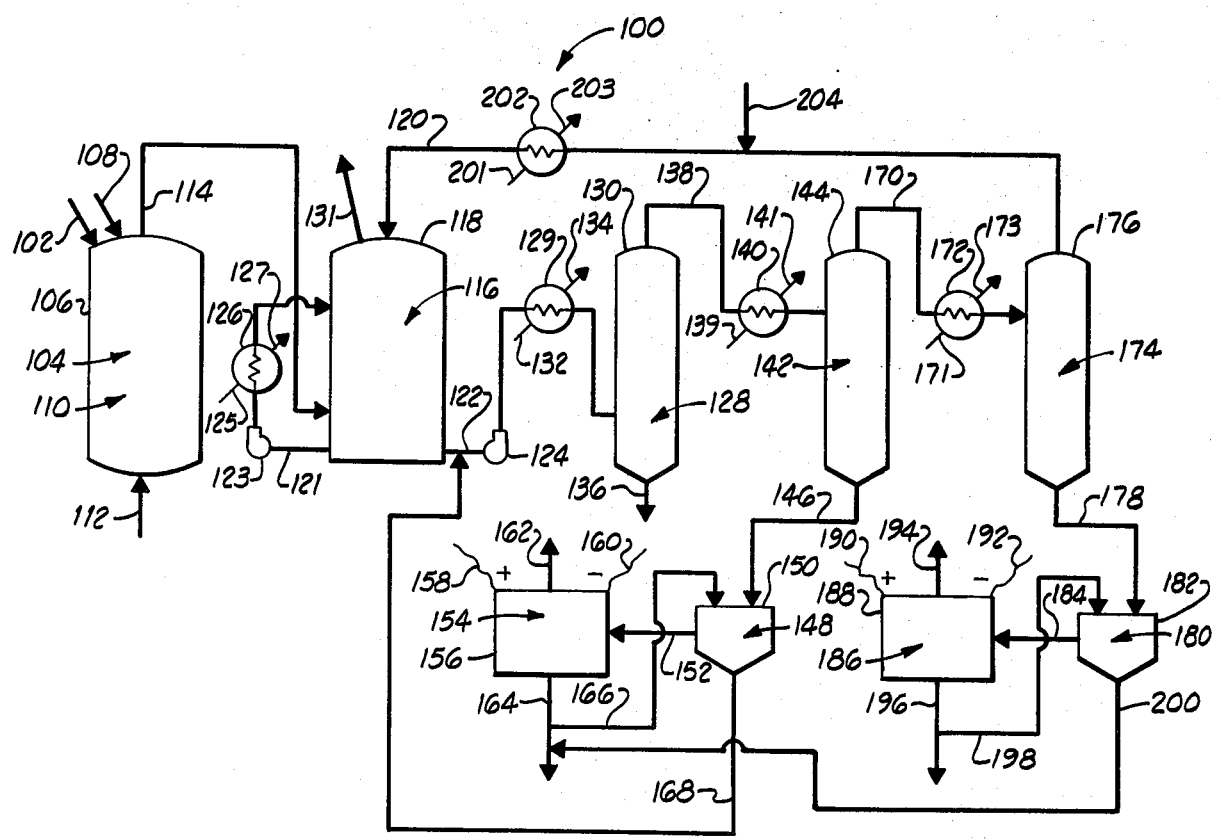
FIG. 2 is a schematic diagram of the flow of materials in another embodiment of the process of the present invention.

Shown in FIG. 2 is a process 100 for producing lead and zinc in accordance with the present invention.

An ore comprising lead and zinc oxides, in a finely divided form, is introduced through a conduit 102 into a second chlorination zone 104 of a second chlorinator 106. A carbonaceous reductant, preferably coke in a finely divided form, also is introduced through a conduit 108 into the second chlorination zone 104 of the second chlorinator 106 to form a second loaded chlorination zone 110. The second loaded chlorination zone 110 preferably is maintained at a temperature in a range from about 600 degrees centigrade to about 1000 degrees centigrade.

Chlorine gas is passed through a conduit 112 into the second loaded chlorination zone 110 to produce a second product stream comprising lead chloride and zinc chloride. The second product stream passes from the second loaded chlorination zone 110 through a conduit 114 and into a second condensation zone 116 of a second condenser 118 to produce a condensate comprising lead chloride and zinc chloride. A recycle solvent, preferably comprising, for example, titanium tetrachloride or silicon tetrachloride and having a temperature in a range between about 20 degrees centigrade and about 70 degrees centigrade, is passed from a source discussed below, through a conduit 120 into the second condensing zone 116 of the second condenser 118.

The temperature in the second condensing zone 116 preferably is maintained in the above mentioned temperature range to produce a condensate comprising solid chlorides of lead and zinc suspended in recycle solvent to form a second slurry comprising about 66 weight percent recycle solvent. At least a portion of the second slurry is circulated through a conduit 121, through a pump 123 and through a cooling chamber 126 for reentry into the second condensation zone 116 at about the above described temperature. A supply of coolant enters the cooling chamber 126 through a conduit 125 and departs through another conduit 127. Vent gases comprising oxides of carbon exit from the second condenser 118 through a conduit 131.

At least a portion of the second slurry is passed from the second condensing zone 116 of the second condenser 118 through a conduit 122, through a pump 124, through a heater 129 and into a third settling zone 128 of a third stage settling tank 130. The heater 129, as shown in FIG. 2, is heated by the contact of a heated fluid entering the heater 129 through a conduit 132 and exiting through a conduit 134.

The second slurry in the third settling zone 128 is maintained within a reduced temperature ($T_R$) range of 0.8 to 1.5 and a reduced pressure ($P_R$) range of 0.8 to 1.5 of the recycle solvent being used to produce a third near-supercritical fluid phase comprising recycle solvent, taken-up lead chloride and taken-up zinc chloride and a third solid phase comprising minor constituents such as copper chlorides and gangue, for example.

The third solid phase is permitted to settle in the third settling to produce a clarified third near-supercritical fluid phase and a settled third solid phase which is segregated by withdrawal from the third settling zone 128 of the third stage settling tank through a conduit 136 for disposal or further processing. The clarified third near-supercritical fluid phase is passed from the third settling zone 128 of the third stage settling tank 130 through a conduit 138, through a heater 140 and into a fourth settling zone 142 of a fourth stage settling tank 144. The heater 140 is heated by contact of a heated fluid entering the heater 140 through a conduit 139 and exiting through a conduit 141.

In the fourth settling zone 142, the clarified third near-supercritical fluid phase is maintained at an increased temperature, decreased pressure or both as compared to those conditions in the third settling zone 128 to induce a retrograde condensation, producing a fourth near-supercritical fluid phase comprising recycle solvent and taken-up zinc chloride and a fourth solid phase comprising particles of lead chloride.

The fourth solid phase is permitted to settle in the fourth settling zone 142 to produce a clarified fourth near-supercritical fluid phase and a settled fourth solid phase which is passed through a conduit 146 to a first displacement zone 148 of a first displacement tank 150. At least a portion of the fourth solid phase is passed from the first displacement zone 148 of the first displacement tank 150 through a conduit 152 into a first electrolytic zone 154 of a first electrolysis chamber 156 for recovery of lead.

The first electrolytic zone 154 comprises at least one anode (not shown) connected by a lead 158 to an electrical source (not shown) and at least one cathode (not shown) connected by a lead 160 to an electrical source (not shown). The slurried fourth solid phase is subjected to electrolysis in the first electrolytic zone 154 and a temperature of at least about 350 degrees centigrade is maintained therein. Chlorine gas is generated at the anode of the first electrolytic zone 154 and the chlorine gas is passed from the first electrolysis chamber 156 through a conduit 162. This chlorine gas may be recirculated (not shown) to the second chlorinator 106, if desired in a particular application.

Metallic lead in the molten form is generated at the cathode of the first electrolytic zone 154 and the metallic lead is passed from the first electrolytic zone 154 of the first electrolysis chamber 156 through a conduit 164. At least a portion of the molten lead is recovered for use or further processing and a portion of the molten lead is passed from the first electrolytic zone 154 through a conduit 166 and into the first displacement zone 148 of the first displacement tank 150. The lead entering the first displacement zone 148 reacts with chlorides of metals less electronegative than lead, such as copper chloride or mercury chloride, for example, to form lead chloride and metallic copper or mercury. The metals thereby formed are permitted to settle in the first displacement zone 148 and are passed from the first displacement zone 148 of the first displacement tank 150 through a conduit 168 and circulated to the conduit 122 passing the second slurry from the second condensing zone 116 of the second condenser 118.

The clarified fourth near-supercritical fluid phase is passed from the fourth settling zone 142 of the fourth stage settling tank 144 through a conduit 170, through a heater 172 and into a fifth settling zone 174 of a fifth stage settling tank 176. The heater 172 is heated by contact of a heated fluid entering the heater 172 through a conduit 171 and exiting through a conduit 173.

In the fifth settling zone 174 of the fifth stage settling tank 176, the clarified fourth near-supercritical fluid phase is maintained at an increased temperature or a decreased pressure or both as compared to those conditions in the fourth settling zone 142 to induce a stepwise retrograde condensation, producing a fifth near-supercritical phase comprising recycle solvent and a fifth solid phase comprising particles of zinc chloride.

The fifth solid phase is permitted to settle in the fifth settling zone 174 to produce a clarified fifth near-supercritical fluid phase and a settled fifth solid phase, a portion of which is passed as a slurry through a conduit 178 into a second displacement zone 180 of a second displacement tank 182. At least a portion of the settled fifth solid phase is passed from the second displacement zone 180 of the second displacement tank 182 through a conduit 184 and into a second electrolytic zone 186 of a second electrolysis chamber 188 for recovery of zinc.

The second electrolytic zone 186 comprises at least one anode (not shown) connected by a lead 190 to an electrical source (not shown) and at least one cathode (not shown) connected by a lead 192 to an electrical source (not shown). The slurried fifth solid phase is subjected to electrolysis in the second electrolytic zone 186 and a temperature of at least about 450 degrees centigrade is maintained therein. Chlorine gas is generated at the anode of the second electrolytic zone 186 and this chlorine gas is passed from the second electrolysis chamber 188 through a conduit 194. This chlorine gas may be recirculated (not shown) to the second chlorinator 106, if desired, in a particular application.

Metallic zinc in the molten form is generated at the cathode of the second electrolytic zone 186 and the metallic zinc is passed from the second electrolytic zone 186 and second electrolysis chamber 188 through a conduit 196. At least a portion of the molten zinc is recovered for use or further processing and a portion of the molten zinc is passed through a conduit 198 and into the second displacement zone 180 of the second displacement tank 182. The zinc entering the second displacement zone 180 reacts with chlorides of metals less electronegative than zinc, such as lead chloride, for example, to form zinc chloride and metallic lead. The lead metal thereby formed is permitted to settle in the second displacement zone 180 and is passed from the second displacement zone 180 of the second displacement tank 182, through a conduit 200 and into the conduit 164 passing lead from the first electrolytic zone 154 of the first electrolysis chamber 156.

The clarified fifth near-supercritical fluid phase is passed from the fifth settling zone 174 of the fifth stage settling tank 176, through a conduit 120 and through a cooling chamber 202 for circulation as recycle solvent to the second condensation zone 116 of the second condenser 118. The cooling chamber 202 is cooled by the passage of coolant therethrough entering through a conduit 201 and exiting through a conduit 203. The recycle solvent may be supplemented as required by makeup recycle solvent supplied through a conduit 204.

An essence of the invention as described in the above processes 10 and 100 is the use of near-supercritical inorganic fluids and retrograde condensations of near-supercritical fluids to separate and recover inorganic metallic salts. Although the precise sequence of metallic chlorides to be produced in the above processes 10 and 100 is predicted as being iron chloride followed by aluminum trichloride in one process 10 and lead chloride followed by zinc chloride in another process 100, based perhaps upon the relationship of their respective boiling points and by analogy with supercritical extractions with organic solvents of organic compounds, only an actual testing will produce the actual sequence. There nevertheless should be a differential near-supercritical solubility permitting a unique and efficient separation of metallic chlorides or other volatile halides or salts by the basic processes 10 and 100 disclosed above.

Changes may be made in the construction, operation and arrangement of the various parts, elements, steps and procedures described herein without departing from the concept and scope of the invention as defined in the following claims.

What is claimed is:

1. A process for separating metallic halides from a mixture comprising metallic halides, the process comprising:
    contacting said mixture with a near-supercritical inorganic fluid having a critical temperature between about 100 degrees centigrade and about 500 degrees centigrade and comprising the same halide as the metallic halides to be separated from the mixture and preferentially taking up at least one metallic halide at the contacting conditions of near-supercritical temperature and pressure such that the near-supercritical inorganic fluid takes up at least a portion of at least one metallic halide forming a near-supercritical fluid phase;
    segregating the near-supercritical fluid phase from any of the mixture not taken up by the near-supercritical fluid while still maintaining aforesaid near-supercritical conditions; and
    separating at least a portion of at least one of said taken-up metallic halides from the near-supercritical fluid phase.

2. The process of claim 1 wherein the inorganic near-supercritical fluid is defined further as being titanium tetrachloride.

3. The process of claim 1 wherein the inorganic near-supercritical fluid is defined further as being silicon tetrachloride.

4. The process of claim 1 wherein the inorganic near-supercritical fluid is defined further as being boron trichloride, tin tetrachloride, phosphorous trichloride or sulfur monochloride.

5. The process of claim 1 wherein the inorganic near-supercritical fluid is defined further as being carbon tetrachloride.

6. The process of claim 1 wherein the mixture is defined further as containing a plurality of metallic halides and a plurality of said metallic halides are taken up by the near-supercritical fluid.

7. The process of claim 6 wherein the separating step is defined further as subjecting the near-supercritical fluid phase containing a plurality of metallic halides to stepwise recovery and the products of these steps are recovered separately.

8. The process of claim 1 wherein said separating is caused by raising the temperature, reducing the pressure or raising the temperature and reducing the pressure of the near-supercritical fluid phase, to thereby induce the retrograde condensation of taken-up metallic halides.

9. The process of claim 1 wherein the temperature of the near-supercritical fluid during said contacting is defined further as being within a reduced temperature ($T_R$) range of 0.8 to 1.5.

10. The process of claim 1 wherein the metallic halides are defined further as being metallic fluorides, bromides, chlorides or iodides.

11. The process of claim 10 wherein the metallic halides are defined further as comprising aluminum trichloride.

12. The process of claim 10 wherein the metallic halides are defined further as comprising aluminum trichloride and iron chlorides.

13. The process of claim 10 wherein the metallic halides are defined further as comprising zinc chloride and lead chloride.

14. The process of claim 10 wherein the metallic halides are defined further as being produced by halogenation of a metalliferous ore.

15. The process of claim 14 wherein the metallic halides are defined further as comprising aluminum trichloride and iron chlorides produced by the chlorination of aluminiferous ore.

16. The process of claim 14 wherein the metallic halides are defined further as comprising zinc chloride and lead chloride produced by the chlorination of an ore comprising zinc and lead.

17. The process of claim 1 wherein the inorganic near-supercritical fluid is chemically inert with respect to the mixture under the process conditions.

18. The process of claim 15 wherein the aluminiferous ore is defined further as being bauxite and the chlorination is defined further as comprising:
    providing a source of bauxite;
    introducing the bauxite into a first chlorination zone;
    providing a source of carbonaceous reductant;
    introducing the carbonaceous reductant into the first chlorination zone to form a first loaded chlorination zone;
    maintaining the first loaded chlorination zone at a temperature ranging from about 900 degrees centigrade and about 1000 degrees centigrade;
    providing a source of chlorine gas; and
    passing the chlorine gas into the first loaded chlorination zone to produce a first product stream comprising aluminum trichloride and iron chlorides.

19. The process of claim 18 wherein the mixture is defined further as being produced by passing the first product stream into a first condensation zone having a temperature between about 20 degrees centigrade and about 70 degrees centigrade to produce a condensate comprising solid chlorides of aluminum and iron.

20. The process of claim 19 wherein the first condensation zone is defined further as comprising a recycle solvent of titanium tetrachloride or silicon tetrachloride to produce a first slurry comprising about 66 weight percent recycle solvent.

21. The process of claim 20 wherein the contacting step is defined further as comprising:
    passing at least a portion of the first slurry to a first settling zone;
    maintaining the first slurry in the first settling zone within a reduced temperature ($T_R$) range of 0.8 to 1.5 of the recycle solvent and at about the supercritical pressure of this recycle solvent to produce a near-supercritical phase characterized as a first near-supercritical fluid phase comprising recycle solvent and taken-up aluminum trichloride and a first solid phase comprising iron chlorides.

22. The process of claim 21 wherein the segregating step is defined further as permitting the first solid phase to settle in the first settling zone to produce a settled first solid phase and a clarified first near-supercritical fluid phase and steps are added comprising:
withdrawing the settled first solid phase from the first settling zone; and
recovering at least a portion of the first solid phase.

23. The process of claim 22 wherein the separating step is defined further as including the steps of:
passing the clarified first near-supercritical fluid phase from the first settling zone to a second settling zone;
maintaining the clarified first near-supercritical fluid phase in the second settling zone at an increased temperature to produce a second near-supercritical fluid phase and a second solid phase comprising aluminum trichloride;
permitting the second solid phase to settle in the second settling zone to produce a settled second solid phase and a clarified second near-supercritical fluid phase;
withdrawing the settled second solid phase from the second settling zone;
recycling the clarified second near-supercritical fluid phase as recycle solvent to the first condensation zone; and
recovering the aluminum trichloride from the settled second solid phase.

24. The process of claim 16 wherein the ore comprising zinc and lead is defined further as being oxidized ore and the chlorination is defined further as comprising:
providing a source of oxidized ore;
introducing the oxidized ore into a second chlorination zone;
providing a source of carbonaceous reductant;
introducing the carbonaceous reductant into the second chlorination zone to produce a second loaded chlorination zone;
maintaining the second loaded chlorination zone at a temperature ranging from about 600 degrees centigrade to about 1000 degrees centigrade;
providing a source of chlorine gas; and
passing the chlorine gas into the second loaded chlorination zone to produce a second product stream comprising lead chloride and zinc chloride.

25. The process of claim 24 wherein the mixture is defined further as being produced by passing the second product stream into a second condensation zone having a temperature between about 20 degrees centigrade and about 70 degrees centigrade to produce a condensate comprising lead chloride and zinc chloride.

26. The process of claim 25 wherein the second condensation zone is defined further as comprising a recycle solvent of titanium tetrachloride or silicon tetrachloride to produce a second slurry comprising about 66 weight percent recycle solvent.

27. The process of claim 26 wherein the contacting step is defined further as comprising:
passing at least a portion of the second slurry to a third settling zone;
maintaining the second slurry in the third settling zone at a temperature within a reduced temperature ($T_R$) range of 0.8 to 1.5 of the recycle solvent and at about the supercritical pressure of this recycle solvent to produce a third near-supercritical fluid phase comprising recycle solvent, taken-up lead chloride and taken-up zinc chloride and a third solid phase comprising copper chlorides and gangue; and
segregating the third solid phase from the third near-supercritical fluid phase.

28. The process of claim 27 wherein the segregating step is defined further as permitting the third solid phase to settle in the third settling zone to produce a settled third solid phase and a clarified third near-supercritical fluid phase and a step is added comprising:
withdrawing the settled third solid phase from the third settling zone.

29. The process of claim 28 wherein the segregating step is defined further as including the steps of:
passing the clarified third near-supercritical fluid phase into a fourth settling zone; and
maintaining the clarified third near-supercritical fluid phase in the fourth settling zone at a temperature increased above that of the third settling zone to produce a fourth near-supercritical fluid phase comprising taken-up zinc chloride and recycle solvent and a fourth solid phase comprising particles of lead chloride.

30. The process of claim 29 wherein the separating step is defined further as including the steps of:
permitting the fourth solid phase to settle in the fourth settling zone to produce a settled fourth solid phase and a clarified fourth near-supercritical fluid phase; and
recovering lead from the settled fourth solid phase.

31. The process of claim 30 wherein the recovery of lead is defined further as including the steps of:
separating the fourth solid phase from the clarified fourth near-supercritical phase; and
subjecting the settled fourth solid phase to electrolysis in a first electrolytic zone.

32. The process of claim 30 wherein the segregating step is defined further as being stepwise and as including the steps of:
separating the clarified fourth near-supercritical fluid phase;
passing the clarified fourth near-supercritical fluid phase into a fifth settling zone;
maintaining the clarified fourth near-supercritical fluid phase in the fifth settling zone at a temperature increased above that of the fourth settling zone to produce a fifth near-supercritical fluid phase comprising recycle solvent and a fifth solid phase comprising particles of zinc chloride.

33. The process of claim 32 wherein the separating step is defined further as being stepwise and including the steps of:
permitting the fifth solid phase to settle in the fifth settling zone to produce a clarified fifth near-supercritical phase and a settled fifth solid phase; and
recovering zinc from the settled fifth solid phase.

34. The process of claim 33 wherein the recovery of zinc is defined further as including the steps of:
separating the settled fifth solid phase from the clarified fifth near-supercritical fluid phase; and
subjecting the settled fifth solid phase to electrolysis in a second electrolytic zone.

35. The process of claim 33 wherein the segregating step is defined further as including the steps of:
separating the clarified fifth near-supercritical fluid phase; and
recycling the clarified fifth near-supercritical fluid phase as recycle solvent to the second condensation zone.

* * * * *